(12) United States Patent
Fedyk et al.

(10) Patent No.: US 10,097,402 B2
(45) Date of Patent: Oct. 9, 2018

(54) FILTER TABLES FOR MANAGEMENT FUNCTIONS

(71) Applicant: HEWLETT PACKARD ENTERPRISE DEVELOPMENT LP, Houston, TX, Houston, TX (US)

(72) Inventors: Donald Fedyk, Littleton, MA (US); Paul Allen Bottorff, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 191 days.

(21) Appl. No.: 15/152,306

(22) Filed: May 11, 2016

(65) Prior Publication Data

US 2017/0331672 A1 Nov. 16, 2017

(51) Int. Cl.
*H04L 12/721* (2013.01)
*H04L 12/24* (2006.01)
*H04L 12/741* (2013.01)

(52) U.S. Cl.
CPC ............ *H04L 41/046* (2013.01); *H04L 41/12* (2013.01); *H04L 45/745* (2013.01)

(58) Field of Classification Search
CPC ... H04L 69/22; H04L 12/4633; H04L 45/306; H04L 45/74; H04L 12/4641; H04L 45/745; H04L 67/16
See application file for complete search history.

(56) References Cited

U.S. PATENT DOCUMENTS

| 7,895,425 B2 | 2/2011 | Khalid et al. |
| 8,626,883 B2 | 1/2014 | Kompella et al. |
| 2009/0199301 A1* | 8/2009 | Chandrasekaran ......... G06F 17/30286 726/27 |
| 2013/0107713 A1* | 5/2013 | Campbell ............. H04L 49/358 370/235 |
| 2014/0341029 A1 | 11/2014 | Allan et al. |
| 2015/0092564 A1 | 4/2015 | Aldrin |
| 2015/0124815 A1* | 5/2015 | Beliveau ................. H04L 45/38 370/392 |
| 2015/0319089 A1 | 11/2015 | Liu et al. |

(Continued)

FOREIGN PATENT DOCUMENTS

| WO | WO-2015/062627 A1 | 5/2015 | |
| WO | WO 2017180098 A1 * | 10/2017 | ............. H04L 12/50 |

OTHER PUBLICATIONS

P. Bottorff et al., "Ethernet MAC Chaining," Network Working Group, Internet Draft, HP Networking, Jul. 20, 2015, pp. 1-19.

*Primary Examiner* — Charles C Jiang
*Assistant Examiner* — Will Lin
(74) *Attorney, Agent, or Firm* — Hewlett Packard Enterprise Patent Department

(57) ABSTRACT

In accordance with examples disclosed herein, a filter table for Media Access Control (MAC) chaining contains mappings between signature addresses, service functions, and management functions, to identify corresponding service function chains. The filter table is to store statistic information about the packet. A controller is to uniquely identify a management function corresponding to the signature address, and modify tables of packet signature addresses usable to modify the packet to cause the packet to be forwarded to the management function. The controller is to update the statistic information about the packet.

14 Claims, 3 Drawing Sheets

(56) References Cited

U.S. PATENT DOCUMENTS

| | | |
|---|---|---|
| 2017/0012799 A1* | 1/2017 | Jiang .................... H04L 12/6418 |
| 2017/0085529 A1* | 3/2017 | Finkelstein ........... H04L 63/101 |
| 2017/0104679 A1* | 4/2017 | Sunavala ............ G06F 9/45558 |
| 2017/0126792 A1* | 5/2017 | Halpern ............... H04L 41/0896 |
| 2017/0126815 A1* | 5/2017 | Kim ........................ H04L 47/76 |
| 2017/0230252 A1* | 8/2017 | Khasnabish .......... H04L 41/142 |
| 2017/0237656 A1* | 8/2017 | Gage ....................... H04L 45/74 370/392 |
| 2017/0279712 A1* | 9/2017 | Nainar .................... H04L 45/64 |
| 2017/0359255 A1* | 12/2017 | Manghirmalani ...... H04L 69/22 |

\* cited by examiner

FILTER TABLES FOR MANAGEMENT FUNCTIONS

BACKGROUND

Service functions are those services provided by a provider to process a data packet. These service functions may be performed on the data packet between networking components. As such, these service functions may provide an enhancement to network operations and/or provide additional services.

BRIEF DESCRIPTION OF THE DRAWINGS/FIGURES

DETAILED DESCRIPTION

Figure 1:
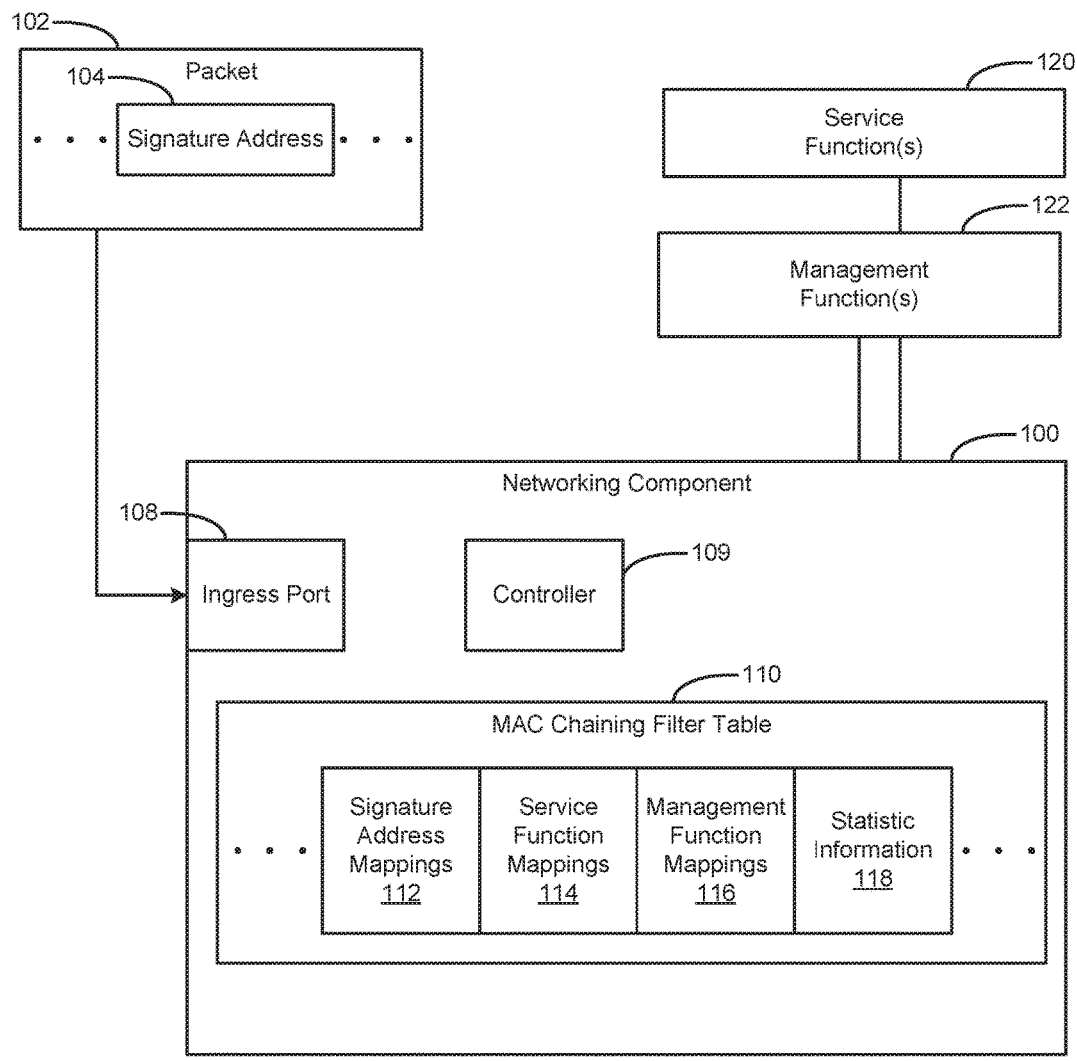
FIG. 1 is a block diagram of a networking component including a filter table according to an example.

The service functions are those services, processes, operations, and/or functions which may be administered by a provider to add value to packet transportation and processing. For example, the service functions may include those services which add value, control quality of service, enhance privacy, and/or provide internal tracking mechanisms. Examples of the service function may include deep packet inspection (DPI), firewalls, tracking packet sizes, encryption/decryption, latency improvements, improvements in resolving addresses, improvements in transferring information to cover packet losses, network address translation, post-identification inspection, network forwarding policy, layer four-layer seven (L4-L7) switching, multiprotocol label switching (MPLS), virtual local area network (VLAN) switching, meta-data switching, hypertext transfer protocol (HTTP) enhancement, data caching, accounting, parental controls, call blocking, call forwarding, etc. The deployment of these service functions are based on the ability to create a service function chain and/or pipeline which are instantiations of instances of these service functions and the traffic flows through these service functions. As such, service function chain may include multiple service functions and specifies those service functions which are to be performed on a given packet during transportation.

Service function chaining is implemented today using a variety of techniques. The most common method is based on a dedicated network device that hard wired static network configuration. When using this method changes in the service chain are very costly since they require physically re-wiring the network and multivendor operational support. Other methods have been proposed to solve the problems caused by hard wired configuration which use proprietary switching formats, meta-data switching, flow switching, etc. The resulting service function chaining may be highly complex and incompatible with existing infrastructure within a network. For example, the service function chaining may use newer protocol formats which may be impractical on existing infrastructure. Thus service function chaining may be infeasible on existing infrastructure. Additionally, a packet may be modified to route to particular service functions, but this may cause issues as the more the packet is changed, these changes may affect other networking aspects. For example, modifications to layers three through layers seven (L3-L7) packet headers may become complicated because packet modifications may cause further issues subsequently in transporting the packet within the network such as fragmentation issues due to packet size changes.

To address these issues, some examples disclosed herein provide a mechanism to enable service function chaining in existing infrastructure. For example, a type of chaining referred to as Media Access Control (MAC) chaining can be used. MAC Chaining is a mechanism to create chains by using MAC addresses that support chain segments. The chain segments may be combined together to create a single chain or very complex chains. In order to ensure that the chaining has been setup properly and is functioning properly MAC chaining examples described herein offer several operational enhancements, such as those provided by various management functions. Many customer or end user flows can use a single MAC chain. MAC chaining can leverage management capability by having management functions intercept management MAC frames in the data plane in service function forwarders (SFFs) and service functions (SFs) that are chain aware. MAC Chains can be configured such that every chain segment is unique by allocating MACs such that the MAC source address (SA) and destination address (DA) are a unique signature (e.g., signature address) that can be looked up to determine the MAC chain that it belongs to. Therefore, any packet or frame that does not match a MAC Chain filter entry can be logged and associated with a broken chain.

The examples disclose a networking component to identify a service function chain based on a signature address from a packet. The signature address which is delivered as part of the packet serves as a unique identifier for the networking component to determine a particular service function chain (including service functions and/or management functions) for processing a given packet. Upon identifying the service function chain, the networking component modifies the signature address within the packet to an address corresponding to a service function or management function. Modifying the signature address, the networking component forwards the packet to the modified address corresponding to the service function or management function. Modifications to the signature address provide compatibility of service function chaining on existing infrastructure. For example, when packets egress from the networking component, these packets with the signature address modifications are considered standard network frames without format change(s). Additionally, modifying the signature address provides the ability to insert and delete service function(s) and/or management function(s) with ease within the service function chains. This provides an additional level of control over the service function(s) performed on a given packet. Furthermore, the filter table of the networking component can include statistic information for tracking packet information.

In other examples discussed herein, the packet is forwarded to a virtual machine hosting the service function and/or management function. In this implementation, virtualizing the service function and/or management function provides flexibility as the packet is not constrained by hard-wired components hosting the service/management function.

In another example discussed herein, the modified signature address is modified within a layer two (L2) portion of the packet and as such may further include modifying a media access control (MAC) address. Modifying the L2 portion of the packet provides less risk as the modifications to the L2 portion are less likely to affect other networking aspects. Also, modifications to the MAC address enable compatibility of service function chaining on existing infrastructure, because the existing infrastructure is equipped to handle MAC addresses.

Examples disclosed herein provide a mechanism in which a service function chain may be compatible on existing infrastructure. Additionally, the examples enable a flexibility for routing the packet to a particular service function.

Referring now to the figures, FIG. 1 is a block diagram of an example networking system including a networking component 100 to receive a packet 102 with a signature address 104. The networking component 100 receives the packet 102 at ingress port 108, and based on the signature address 104 as part of the packet 102, the networking component 100 uses the filter table 110 in Media Access Control (MAC) chaining, to contain mappings between signature addresses 112, service functions 114, and management functions 116. This enables the networking component 110 to identify corresponding service function chains. The filter table 110 also is to store statistic information 118 about the packet 102.

The controller 109 is to uniquely identify a management function 122 corresponding to the signature address 104, and modify tables of packet signature addresses usable to modify the packet 102 to cause the packet 102 to be forwarded to the management function 122. The controller 109 can be a management agent, which can work in conjunction with a service chaining controller (such as an OpenFlow controller, see element 206 of FIG. 2A). In an example implementation, the controller 109 can share overlapping responsibilities with the service chaining controller. Functions of the management agent also can be provided locally by service chain forwarder function (SFF) tables, in addition to the service chaining controller's functions. Additionally, although the controller 109 is illustrated as a single component, aspects of programming, management, tracing, and other operations can be provided independently/remotely, and/or passed to a central controller (such as a central processing unit (CPU)). The controller 109 is to update the statistic information 118 about the packet 102. The service function chain may include those service function(s) 120 and/or management function(s) 122 that a networking carrier may wish to perform upon the packet 102 when routing between computer nodes in the networking system. As such, the service function chain includes the addresses of the locations of those service function(s) 120 and/or management function(s) 122 to route the packet 102. The networking system as illustrated in FIG. 1 represents a data network in which networked computing devices (e.g., networking components) may exchange data in the form of the packet 102. These networked computing devices establish data connections in the form of networking links between nodes to route and/or forward the packet 102. Implementations of the networking system include, by way of example, a telecommunications network, Internet, Ethernet, wide area network (WAN), local area network (LAN), optic cable network, virtual network or other type of networking system which passes packets 102 between nodes.

The networking component 100 can include a networked computing device which may establish the data connection with other networking components and/or forward the packet 102 accordingly. As such, the networking component 100 receives the packet 102 at ingress port 108, and based on the signature address 104 within the packet 102, the networking component 100 identifies the service function chain and modifies the signature address 104 and/or the filter table 110 mappings 112-116 accordingly. Implementations of the networking component 100 include a multi-port network device, multi-layer switch, media access control (MAC) switch, router, virtual switch or other type of networking component capable of receiving the packet 102 and modifying the signature address 104 and/or filter table 110 mappings. Although FIG. 1 illustrates the networking component 100 as a single element, implementations are not so limited, as the packet 102 may be routed among multiple networking component(s) 100 as detailed in FIG. 2, for example.

The various functions 120, 122, and/or the use of statistic information 118, thereby enable additional control plane (e.g., software defined networking (SDN)) functions, as well as data plane functions, in the context of MAC chaining. Example functions include control plane functions such as MAC filter table trace, and data plane functions such as chain segment/branch tracing and continuity tests, MAC frame statistics, forwarded frames (MAC signature), dropped frames (MAC signature), delay measurements, load measurement feedback, and the like. Pre-provisioning management functions can check the operation of the service function chain (SFC) before live traffic is placed on the SFC. Tracing can be used to determine all the paths in the chain, including complex chains having branches and multiple paths, where example management frames enable testing of all paths (in contrast to relying on data that may not exercise all paths in a chain). Failure detection management functions enable isolation of the failure inside the network, and identifying where the chain is broken. Failure detection can be based on a continuity check message, whereby failure is detected by the loss of a continuity check message. Failure detection can also be used to raise a notice of the failure through a management plane, thereby flagging the failure for management to handle.

MAC chaining according to the example implementations described herein can enable various management functionalities. The unique signature of frames allows easy tracing and debugging of MAC chains in a compact way, e.g., using an ID of 96 bits (12 bytes). This information can be compressed in many cases. By using a unique allocated space for MAC chains, debugging and tracking of chains is made easier. Branches in any type of chain can be tested and monitored.

The control plane and data plane functionality enables, e.g., tracing of service function chains. The mapping of management functions 122 to the signature address 104 (e.g., which may be based on a MAC DA and SA) can be created uniquely and stored in a database of active/allocated chains. Service functions 120 and classification functions can keep other higher level information. This allows service chains to be verified, monitored, and debugged independent of the user frames.

The MAC chaining signature address 104 can include a MAC DA, or a MAC DA and a MAC SA. The combination of MAC DA and MAC SA can be allocated uniquely as the signature address 104 by ensuring that MAC DA is unique per chain segment. However, in cases where the MAC DA alone is not unique, the MAC SA additionally can be uniquely allocated as the signature address 104. Therefore, a combination of MAC DA and MAC SA is unique and represents a unique signature address 140 per chain segment MAC authority. MAC chaining can use local MAC addresses, so in general the MAC DA and MAC SA can be reused and can include combinations that are not unique, but MAC chaining can be designed such that, within a chain segment MAC authority, the allocation of the MAC DA and MAC SA combination as the signature address 104 can be uniquely addressed to a particular chain. Systems that keep the signature unique have the ability to identify dropped frames and optionally forwarded frames with more detail than other service chaining mechanisms.

The packet 102 is considered a networking packet or data packet which is a formatted unit of data carried by the networking system. For example, a data packet and/or data frame can include wire formats for standardizing portions of the packet 102. The packet 102 can include at least two kinds of data, such as network control information and user data (i.e., the payload). As such, the control information may further include the signature address 104. The control information provides data for the networking system to deliver the payload to the appropriate destination. For example, the control information may be part of an open systems interconnection (OSI) model and as such may include the data that characterizes and standardizes the internal communication functions by partitioning the network control into various abstract layers, such as layers one through layers seven (L1-L7). This control information may be found within the headers and/or trailers. In this example, the signature address 104 would be considered part of the layer two (L2) portion of the packet 102.

The signature address 104 is a unique identifier assigned within the packet 102 for communications on a physical networking segment. This unique identification of the signature address 104 enables the networking component 100 to uniquely identify the service function chain. Uniquely identifying the service function chain, the networking component 100 may identify the signature address(es) in which to modify for forwarding the packet 102 to the appropriate service function(s) 120 and/or management function(s) 122. The signature address 104 is a media access control (MAC) address, and can be part of the L2 portion of the packet 102.

The networking component 100 utilizes a MAC chaining filter table 110 to locate the signature address 104 within the database (at signature address mappings 112) and the corresponding service function chain (at service function mappings 114 and/or management function mappings 116), which can include service function(s) 120 and/or management function(s) 122. The filter table 110 may include various signature address(es) 112 and the various service function chains. Thus, the networking component 100 utilizes the signature address mappings 112 to identify the particular service chain corresponding to service function mappings 114 and/or management function mappings 116. The networking component 100 can modify the destination address and/or the source address of the signature address 104 of the packet 102. The filter table 110 may include, by way of example, instructions (e.g., stored on a machine-readable medium) that, when executed (e.g., by the networking component 100), implement the functionality described and illustrated herein. Alternatively, or in addition, functionality may be implemented using electronic circuitry (i.e., hardware) that implements the described functionality.

The modified signature address 104 represents the address for corresponding relevant mappings 112-116. Upon identifying the service function chain, the networking component 100 changes the corresponding mappings 112-116, e.g., modifies tables of packet signature addresses (signature address mappings 112) usable to modify the packet 102 to cause the packet 102 to be forwarded to the management function 122. As such, the networking component 100 identifies and modified the filter table 110 to enable management functions 122.

The service function(s) 120 and/or the management function(s) 122 can be provided by the network carrier for processing the packet 102. As such, the functions 120, 122 can be a service the networking carrier wishes to inject between networking nodes during transportation of the packet 102. Functions 120, 122 can represent at least one segment of the service function chain. For example, the service function chain may consist of various service function(s) 120 and management function(s) 122 during transportation of the packet 102. In this manner, the functions 120, 122 can create a hop which performs the relevant functions 120, 122 on the packet 102.

The management function(s) 122 can provide various functions. In an example, the management function 122 can trace a service function chain (SFC) to check chain integrity of the SFC, including locating and isolating an integrity failure of the SFC. In an alternate example, the management function 122 can provide a MAC filter table trace. Controller 109 or some authority/component such as network component 100 can program the MAC filter table 110 to setup the chains. The chain is complete when the entries have all been set and the head classifier is given the head of the chain MAC DA. Branches may be added to the chain for load balancing or other operations of the chain. The SDN controller can query the SFF functions of a chain and ensure that the chain is properly configured. Service functions that are not chain aware will have limited OAM capability. Service functions that are chain aware can be queried for MAC Filter table integrity and tracing.

Using this method the controller 109 or networking component 100 can walk the chain. For service functions 120 that are not MAC chaining aware, the table walk can skip these functions because the MAC Filter table 110 has both the next address of the SF and the address of the following SFF (e.g., based on addresses that make up the signature address 104). In an example, a management function 122 can serve as a provisioning function to check operation of a SFC before putting live traffic on the SFC.

The packet 102 can include metadata (not specifically illustrated) in addition to the signature address 104. Such metadata can be a management tag or other information, which is also usable by the networking component 100 to perform mappings. In an example, the metadata of the packet includes a type-length-value (TLV) portion storing a tag to uniquely indicate the management function corresponding to the tag. Tracing an inband end to end classification function to chain termination function can use a forwarding trace operation that can allow both management frames and user frames with metadata to be forwarded following the chain. The frames can be forwarded transparently as exception frames that include the metadata. Branching nodes (e.g., load balancing and MAC chaining aware service functions) can use metadata in the frame to exercise a particular branch of a service function chain. If no branch instruction is found in the frame the service function may use a heuristic based on the packet payload. A management function 122 can generate a management packet, independent of user traffic, containing management information usable to exercise a given branch of the SFC. The networking component 100 can identify that a management packet does not contain management information, and the management function 122 can use a heuristic approach based on a packet payload to exercise a given branch of the SFC. This allows tracing of all branches and tracing user branches. In an example, a management function 122 can send a management packet 102 to an upstream service function forwarder (SFF) to invalidate an entry in the SFF corresponding to an integrity failure in a SFC. In an alternate example, the management function 122 can send a management packet to a management plane to inform the management plane to handle an integrity failure in a SFC.

As one example of how to exercise all branches in a chain, branching control of the MAC chain can be reduced to a binary tree where each branch is a 0 or 1, decision and multiple branches of more than two are enumerated as multiple 2 decision trees. The controller 109 therefore can generated a minimal match binary prefix for every branch point. In an example, the controller 109 can convert a N-ary branching control of a MAC chain to a binary tree, and generate a minimal match binary prefix for a given branch point of the binary tree branching control. The controller 109 can assign a local branch prefix to a given service or management function 120, 122. The local branch prefix enables the corresponding function to compare the local branch prefix to the minimal match binary prefix and accordingly determine which branch to take. When an SF or SFF needs to branch, it can determine which branch to take by comparing the binary number to its local assigned branch prefix, which includes all previous branches but allows any number of branches after that function. To allow for branches that recombine, a node may mask out previous branches that are not unique. The matching operations are all preprogrammed by a controller so every branch combination is possible.

Compact signature statistics are also possible. MAC chaining allows frames that are processed through the MAC Address filtering table 110 to be counted or sampled and associated with a signature, and/or with statistic information 118. Frames that are discarded can track the signature allowing easy identification of misrouted frames. Echo or ping capability allows checking the operation of the chain. The statistic information 118 can correspond to performance tracking of the packet, and/or topology monitoring of the packet. Such statistic information 118 can be stored for not only management frames, but also for any frame including user traffic frames. Thus, performance measurements are possible through the statistic information 118, such as measuring latency across the chain, attempting to maximize bandwidth across the chain, and other performance monitoring aspects. Statistic information 118 also can be used for topology monitoring, such as assuring chain integrity, and being able to trace and prove specific elements/branches within the chain.

The statistic information 118 generally can be used for different types of statistics, such as management types of statistics for management-based frames, and general types of statistics used in network traffic. The general types of statistics can be adjusted by the controller 109 to account for management frames. For example, if using statistic information 118 to count frame traffic, the controller can avoid counting management frames so that the management frames do not contribute to the count of frame traffic. Statistic information 118 can be used to track delay measurements, using specific fields inside the frame to carry the delay measurement, and counting the round-trip delay via timestamps. Other statistics include packet counts, drop counts, invalid packet counts, and the like (e.g., categories where the controller may not include counts of management frames, selectively incrementing such counts in response to normal user traffic and not the management frames generated by the networking component 100).

Such features enable the re-use of MAC chaining forwarding with maximum transparency to services. Functionality is scalable because, e.g., there are millions of MAC local addresses corresponding to a given company ID. The features described herein also have a limited effect on packet maximum transmission unit (MTU), due to the use of signature address 104 and/or metadata. The signature address 104 provides the ability to identify all chains uniquely, while providing maximum transparency.

FIG. 2A is a block diagram of an example networking system illustrating various paths (Path 1 or Path 2) for a packet 102 to take from a networking component (e.g., Switch 2) to various functions (Service Functions 1, 2 114, Management Function 1 116, and so on) as part of a service function chain (SFC). The networking system includes an ingress classification 208 (e.g., associated with an ingress port 108 as shown in FIG. 1) to receive the packet 102 and route to the networking component 202 (e.g., Switch 1). In this implementation, the ingress classification 208 receives the packet 102 without "ChainSegDA," switch address. The ingress classification 208 determines the networking component 202 to forward the packet 102 based on an inspection of the user data (i.e., payload) in the packet 102. The ingress classification 208 identifies the packet 102 through a formatted data unit, such as a header, tail, and/or other identifying information. The identifying information matches ingress classifier policy indicates to the ingress classification 208 that a given packet should undergo at least one service function 114 and/or at least one management function 116, and as such is part of the service function chain. For example, the ingress classification 208 reconstructs the application in which to terminate a transmission control protocol (TCP) transport and builds an application extensible markup language (XML) webpage to then use a key in the XML to determine the chain in which to forward the packet 102. Upon identifying the chain in which to forward the packet 102, the ingress classification 208 builds or modifies at least one packet to be directed to the service function chain. In this example, the ingress classification 208 creates the packets 102 with a "ChainSegDA," determined by the ingress classifier policy 208. Determining the packet 102 should undergo the service function(s) 114 number 1, and management function 116 number 1, the ingress classifier identifies an address of the networking component and path 1 at the head of the chain and thus forwarding the packet 102 to that networking component and path.

At this first switch 202 (Switch 1), a switch address within the packet 102 is modified in accordance with the identified service function chain. The switch address within the packet 102 may be modified according to a filter table 212 as illustrated in FIG. 2B, which may be similar to the filter table 110 of FIG. 1. This filter table 212 may be constructed to at least one of the switches 202 (Switch 1 and/or Switch 2) from an OpenFlow controller 206. Enabling the OpenFlow controller 206 to provide the filter table 212 to at least one of the switches 202, allows a network carrier to decide which service function(s) 114 and/or management function(s) 116 to perform on a given packet 102. For example, the service function chain may include a single service function 114 and/or a single management function 116, or combination of service functions 114 and management functions 116 (Service Function 1, Service Function 2, and/or Management Function 1). Each service function 114 and/or management function 116 represents a different service provided by the networking carrier to process the packet 102 during transportation. For example, the first service function (Service Function 1) may include a deep packet inspection, while the second service function (Service Function 2) may determine an internal housekeeping function for billing such as the billable size, etc., and a third service function (not specifically illustrated in FIG. 2A) might provide a service to improve quality enhancement to the packet 102. The management function(s) 116 may perform functions consistent with the example implementations described above with respect to the management function 122 of FIG. 1. The service/management function(s) 114, 116 may reside on a virtual Ethernet. The virtual Ethernet (Virtual Ethernet 1 and/or Virtual Ethernet 2) represent a virtual machine which may host each of the service function(s) 114 and/or management functions 116. These virtual machines may host multiple service functions 114 and/or management functions 116, or may host an individual service function 114 or management function 116.

Each path (Path 1 or Path 2) for the packet 102 depends on which service function chain is identified. Each service function chain may include different combinations of the service function(s) 114 and/or management function(s) 116. For example, the first path (Path 1) of the packet 102 proceeds to the first switch 202 (Switch 1), the first service function 114 (Service Function 1), the second switch 202 (Switch 2), the management function 1 116, and back to the second switch 202 (Switch 2) prior to egress at the egress classification 210. In another example, the second path (Path 2) of the packet 102 takes fewer hops or service function(s) than the first path. In this example, the second path (Path 2) proceeds to the first switch 202 (Switch 1), the first service function 114 (Service Function 1), the second switch 202 (Switch 2), the second service function 114 (Service Function 2), and back to the second switch (Switch 2) prior to egress at the egress classification 210.

The egress classification 210 is a component within the networking system which receives the packet 102 upon operation of the service function(s) 114 and/or management function(s) 116 and routes the packet 102 upon egress of the networking system within FIG. 2A. In one implementation, the egress classification 210 may determine the port in which to egress the packet 102.

As explained earlier, the filter table 212 may be used to identify or lookup the service function chain and the addresses associated with particular service function(s) and/or management function(s) based on the signature address (ChainSegDA) within the packet 102. This is described in greater detail in FIG. 1 above, as well as in FIG. 2B.

FIG. 2B is a table of an example filter table 212 for use by a networking component (e.g., switch 202) to identify a service function chain from a signature address 214 in a packet 102. In an example, the networking component constructs the filter table 212 from the OpenFlow controller 206 for identifying which particular service function chain to implement for a given packet. The networking component identifies the signature address from the given packet 102. The signature address 214 is a unique identifier for the networking component to use for locating the corresponding service function chain. The service function chain includes a destination address 216, a source address 218, which port 220 in which to forward the packet 102, and/or statistic information 222. Identifying the service function chain using this signature address, the networking component uniquely identifies the service function chain from the filter table 212 and the particular addresses 216 and 218 associated with the service function 114. For example in the filter table 212, the signature addresses 214 for various packets include: ChainSegDA1, ChainSegDA2, and ChainSegDAn. Each of the signature addresses 214 illustrate a chain segment destination address as provided in each packet 102. Using this chain segment destination address 214, the networking component determines a subsequent destination address 216 (DA1', DA2', and DAn') and a subsequent source 218 (ChainSegSA1', ChainSegSA2', and ChainSegSAn'). Thus, the signature destination address (ChainSegDA1, ChainSegDA2, and ChainSegDAn) determines the addresses 216 and 218 in which to modify the signature address 214 within the packet to the next destination address 216 and the next source address 218. The subsequent destination address 216 (DA1', DA2', and DAn') is the address to forward the packet 102 for performance of the service function 114. The modified source address 218 (ChainSegSA1', ChainSegSA2', and ChainSegSAn') is the address in which the service function, a proxy and/or virtual machine hosting the service function 114 forwards the packet 102 upon the performance of the service function 114. In another implementation, the networking component uses both the signature destination address 214 and a signature source address (SA) within the packet 102 to determine the addresses 216 and 218 in which to modify the signature address 214. In addition, the filter table 212 includes the port 220 connected to the virtual machine and/or virtual network for forwarding the packet 102 to the service function 114. In further implementations, the filter table 212 may include an entry specifying a direction of the packet 102. Furthermore, as set forth above regarding FIG. 1, the filter table 212 may include statistic information to track metrics of packets, whether the packets are management packets or user traffic packets.

Figure 3:
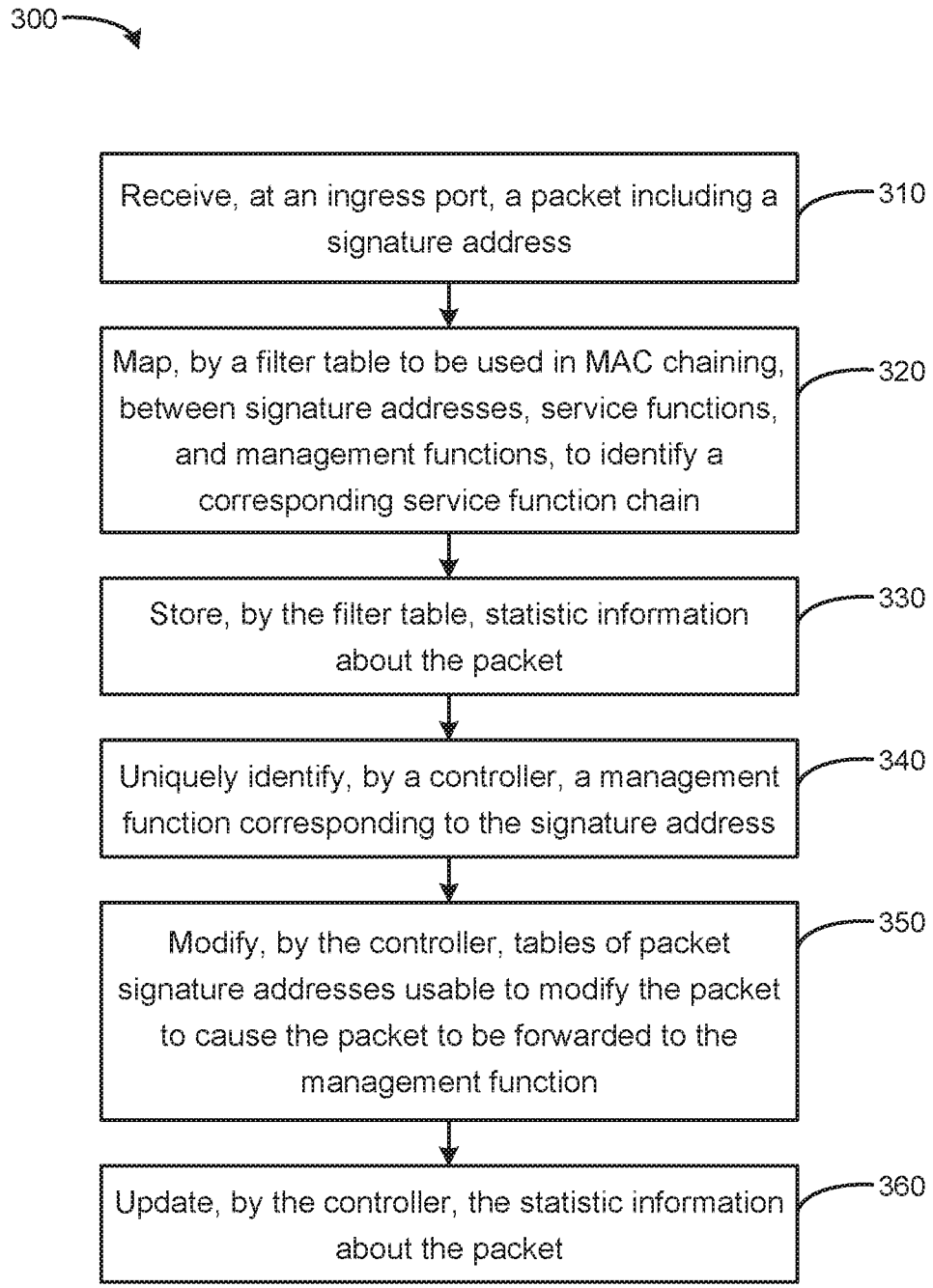
FIG. 3 is a flowchart of an example method to map between signature addresses, service functions, and management functions.

FIG. 3 is a flowchart of a method executable by a networking component to map between signature addresses, service functions, and management functions. In block 310, the networking component receives the packet and from the packet determines a signature address. In one implementation, the signature address may be found in the layer two (L2) portion of the packet. As such in this implementation, the packet may be formatted for compliance with IEEE 802® standards. In other implementations the packet is in a format such as an open systems interconnection model (OSI). Upon receiving the packet, the networking component distinguishes the signature address from other information included in the packet. Utilizing the signature address, in block 320, the networking component can map, by a filter table to be used in MAC chaining, between signature addresses, service functions, and management functions, to identify the corresponding service function chain. In one implementation, the service function chain includes at least one service function and/or management function which may be provided to the packet when routing the packet from node to node within a networking system. In another implementation, the service function may be null within the service function chain so the next hop (e.g., subsequent location) in the chain is the egress of the packet. In block 330, the networking component stores, via the filter table, statistic information about the packet. For example, the statistic information can include counts of user frames, round-trip delay timing information, and the like, which can be used to diagnose various networking issues. In block 340, the controller is to uniquely identify a management function corresponding to the signature address. For example, the controller can identify the signature address entry in the filter table, and map the signature address to a corresponding management function in the filter table. In block 350, the controller is to modify tables of packet signature addresses usable to modify the packet to cause the packet to be forwarded to the management function. For example, the controller can modify a forwarding database (FDB) entry used by the network device, updating a destination address entry corresponding to a management function. In block 360, the controller is to update the statistic information about the packet. For example, the controller can update a statistic information entry in the filter table to track metrics such as round-trip delay of a given packet.

Figure 2:
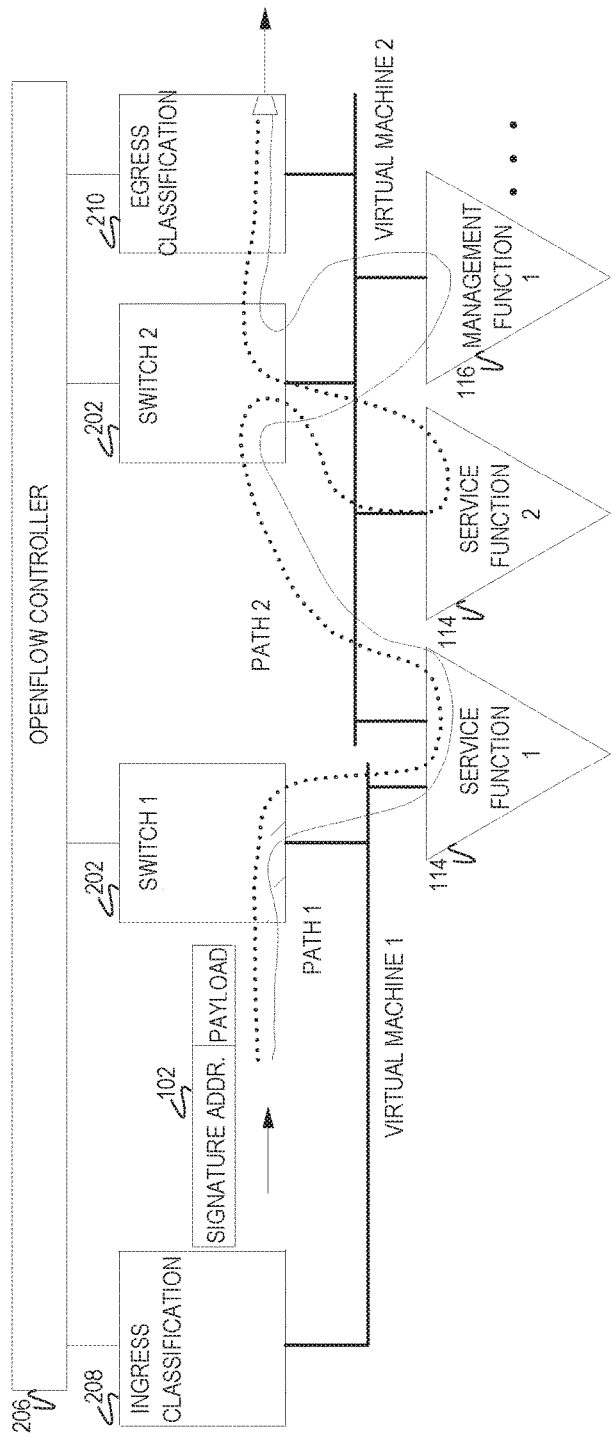
FIG. 2A is a block diagram of example networking system illustrating various paths for a packet to take from a networking component to various service functions and management functions as part of a service function chain.
FIG. 2B is a diagram of an example filter table for use by a networking component to identify a service function chain based on a signature address in a packet.

In discussing FIG. 3, references may be made to the components in FIGS. 1-2 to provide contextual examples. In one implementation, the networking component 100 in FIG. 1 can execute operations 310-360 to modify the signature address in the packet and forward the packet in accordance with the modified signature address. Further, although FIG. 3 is described as implemented by a controller, it may be executed on other suitable components. For example, FIG. 3 may be implemented in the form of executable instructions on a machine-readable storage medium.

Service function chains are considered those service functions and/or management functions (e.g., processes) which a networking carrier may wish to provide for a particular packet. As such, upon the networking component receiving the packet, the networking component may further identify which packets to process to which service function chains. In one implementation, the networking component may construct a database from an OpenFlow controller. The database includes at least one service function chain so the networking component may use the database to identify the service function chain which corresponds to the signature address provided as part of the packet. In this implementation, the database includes the signature address for the networking component to look up and the corresponding service function chain.

Operation 350 involves modifying the signature address within the packet as received at operation 310. The signature address is modified to an address corresponding to the uniquely identified management function. The management function is considered a segment or process as part of the service function chain in which to perform the particular service. In this implementation, the signature address can include both a destination address and a source address, which can be modified in the layer two (L2) portion of the packet. Modifying the outer L2 portion of the packet, rather than deeper portions of the packet (L2-L7), provides fewer complications in the networking system and is more efficient in terms of data operations. For example, modifying the outer L2 portion of the packet provides less risk in affecting other networking aspects within the system as providing a more straightforward approach to modification of the switch address. In another implementation, the networking component forwards the packet to a virtual machine hosting the management function. In this implementation, the packet may be forwarded to the virtual machine residing on the networking component or may be forwarded to another networking component hosting the virtual machine.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct a controller to modify tables of packet signature addresses, wherein the engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A networking component comprising:
   an ingress port to receive a packet including a signature address;
   a filter table to be used in Media Access Control (MAC) chaining, to contain mappings between signature addresses, service functions, and management functions, to identify corresponding service function chains, wherein the filter table is to store statistic information about the packet;
   a controller to uniquely identify a management function corresponding to the signature address, and modify tables of packet signature addresses usable to modify the packet to cause the packet to be forwarded to the management function, wherein the controller is to update the statistic information about the packet and convert a N-ary branching control of a MAC chain to a binary tree, and generate a minimal match binary prefix for a given branch point of the binary tree branching control.

2. The networking component of claim 1, wherein the management function is to trace a service function chain (SFC) to check chain integrity of the SFC, including locating and isolating an integrity failure of the SFC.

3. The networking component of claim 1, wherein the management function is to generate a management packet, independent of user traffic, containing management information usable to exercise a given branch of a service function chain (SFC).

4. The networking component of claim 1, wherein, in response to identifying that a management packet does not contain management information, the management function is to use a heuristic approach based on a packet payload, to exercise a given branch of a service function chain (SFC).

5. The networking component of claim 1, wherein the controller is to assign a local branch prefix to a given service or management function, wherein the local branch prefix enables the corresponding function to compare the local branch prefix to the minimal match binary prefix and accordingly determine which branch to take.

6. The networking component of claim 1, wherein the management function is to send a management packet to an upstream service function forwarder (SFF) to invalidate an entry in the SFF corresponding to an integrity failure in a service function chain (SFC).

7. The networking component of claim 1, wherein the management function is to send a management packet to a management plane to inform the management plane to handle an integrity failure in a service function chain (SFC).

8. The networking component of claim 1, wherein the management function is a provisioning function to check operation of a service function chain (SFC) before putting live traffic on the SFC.

9. The networking component of claim 1, wherein the metadata of the packet includes a type-length-value (TLV) portion storing a tag to uniquely indicate the management function corresponding to the tag.

10. The networking component of claim 1, wherein the statistic information corresponds to at least one of i) performance tracking of the packet, and ii) topology monitoring of the packet.

11. A method, comprising:
receiving, at an ingress port, a packet including a signature address;
mapping, by a filter table to be used in Media Access Control (MAC) chaining, between signature addresses, service functions, and management functions, to identify a corresponding service function chain (SFC);
storing, by the filter table, statistic information about the packet;
uniquely identifying, by a controller, a management function corresponding to the signature address;
modifying, by the controller, tables of packet signature addresses usable to modify the packet to cause the packet to be forwarded to the management function;
updating, by the controller, the statistic information about the packet;
converting a N-ary branching control of a MAC chain to a binary tree, and generate a minimal match binary prefix for a given branch point of the binary tree branching control.

12. The method of claim 11, further comprising tracing, by the management function, a service function chain (SFC) to check chain integrity of the SFC, including locating and isolating an integrity failure of the SFC.

13. A non-transitory machine-readable storage medium encoded with instructions executable by a computing system that, when executed, cause the computing system to:
receive, at an ingress port, a packet including a signature address;
map, by a filter table to be used in Media Access Control (MAC) chaining, between signature addresses, service functions, and management functions, to identify a corresponding service function chain;
store, by the filter table, statistic information about the packet;
uniquely identify, by a controller, a management function corresponding to the signature address;
modify, by the controller, tables of packet signature addresses usable to modify the packet to cause the packet to be forwarded to the management function;
update, by the controller, the statistic information about the packet;
convert a N-ary branching control of a MAC chain to a binary tree, and generate a minimal match binary prefix for a given branch point of the binary tree branching control.

14. The storage medium of claim 13, further comprising instructions that cause the computing system to generate a management packet, independent of user traffic, containing management information usable to exercise a given branch of a service function chain (SFC).

* * * * *